UNITED STATES PATENT OFFICE.

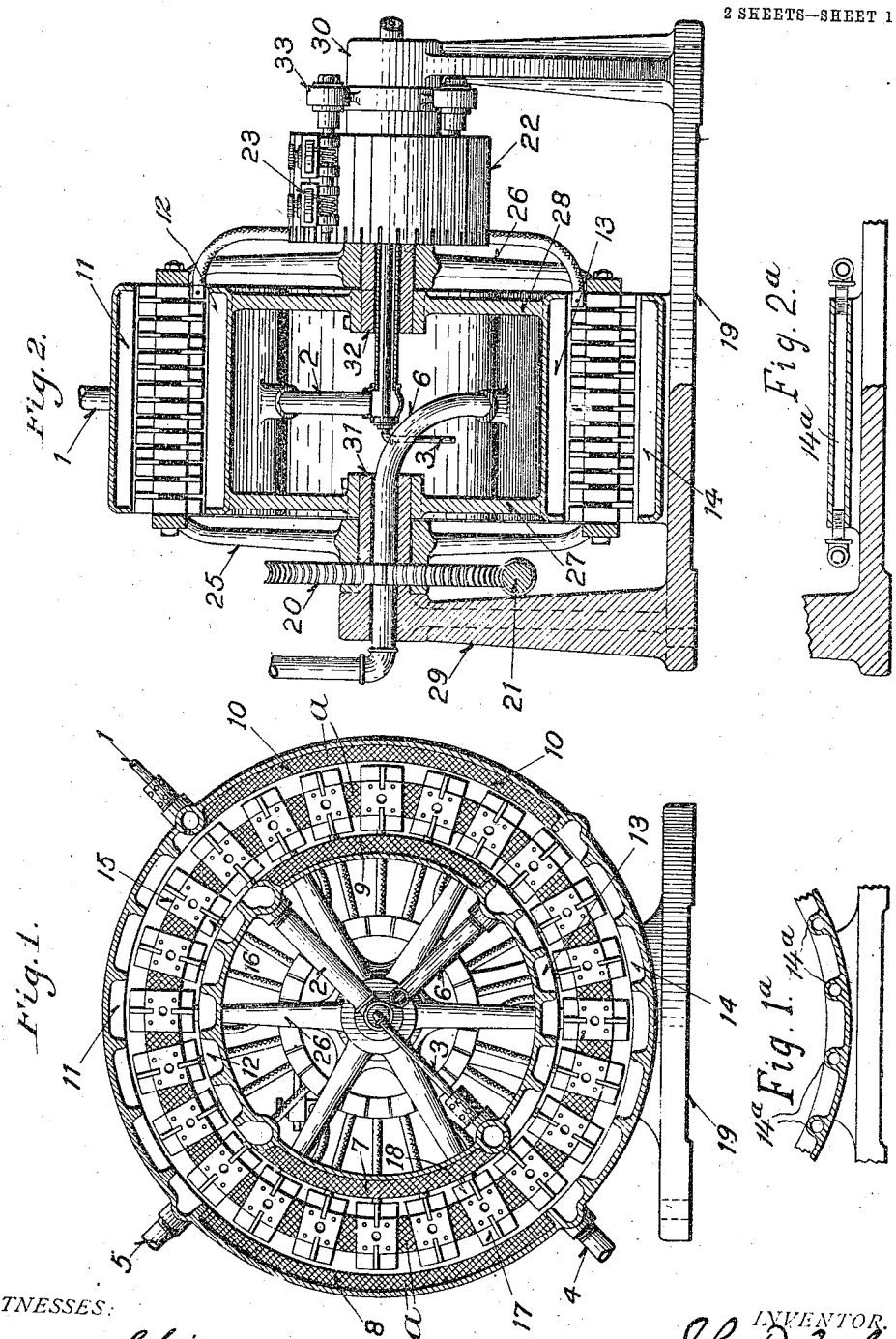

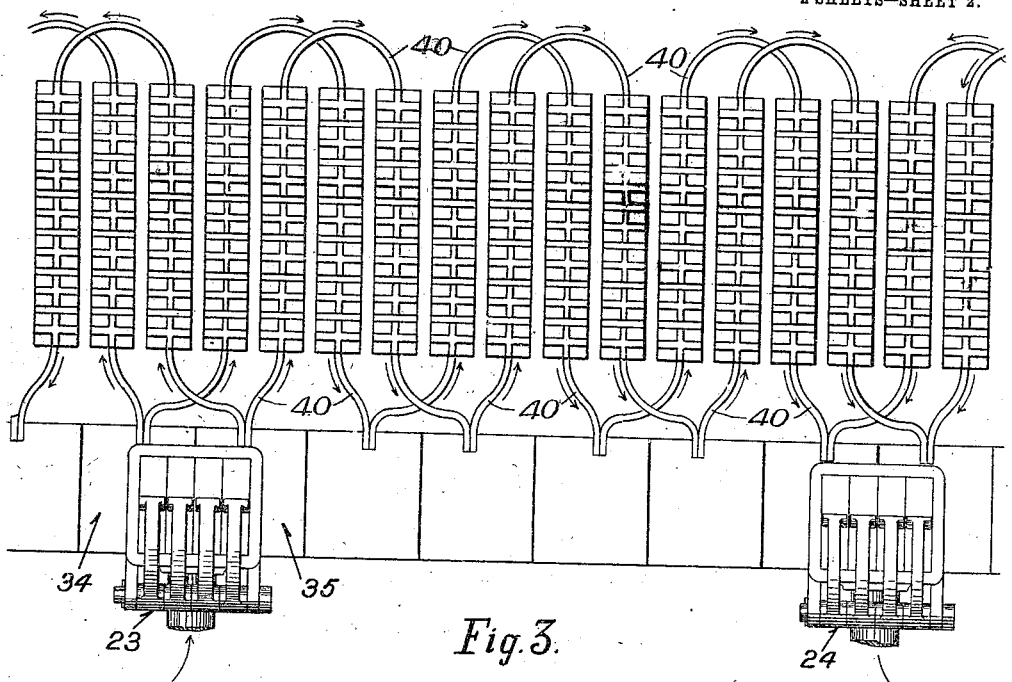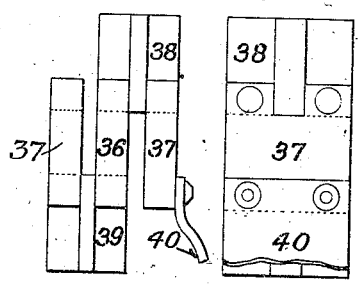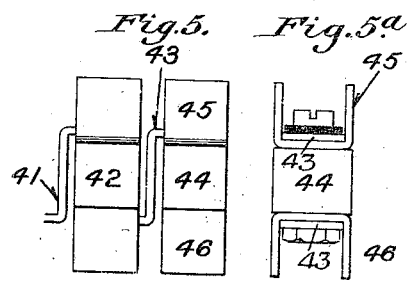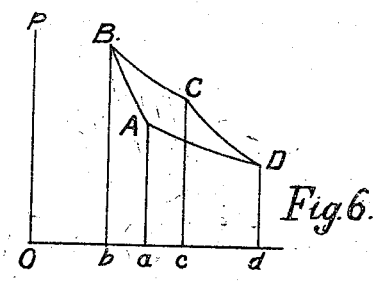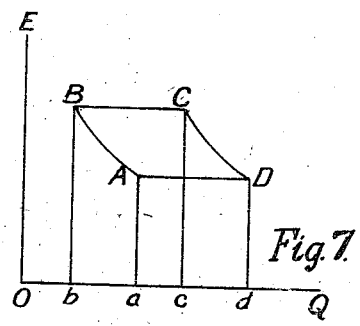

JOHN D. TAYLOR, OF PITTSBURG, PENNSYLVANIA.

THERMO-ELECTRIC GENERATION.

941,826. Specification of Letters Patent. Patented Nov. 30, 1909.

Application filed March 27, 1907, Serial No. 364,771. Renewed January 18, 1909. Serial No. 472,996.

*To all whom it may concern:*

Be it known that I, JOHN D. TAYLOR, of Pittsburg, Allegheny county, Pennsylvania, have invented a new and useful Improvement in Thermo-Electric Generation, of which the following is a full, clear, and exact description, reference being had to the accompanying drawings, forming part of this specification, in which—

Figure 1 is a vertical section, or sectional end elevation, of one form of thermo-electric generator embodying my invention; Fig. 2 is a longitudinal vertical section of the same; Figs. 1a and 2a are detail views showing a modification; Fig. 3 is a development of a portion of the drum commutator; Figs. 4 and 4a are detail views showing one mode of connecting the elements; Figs. 5 and 5a are similar views showing another way of connecting the elements; and Figs. 6 and 7 are diagrams hereinafter more fully described.

My invention is based on the discovery by Seebeck that, if in a closed circuit of two metals, the two junctions of the metals are at different temperature an electric current will flow around the circuit, and the discovery by Peltier that, if a current flows across the junction of two metals in one direction, heat is absorbed, while if it flows in the opposite direction, heat is liberated. Up to the present time no practical application of these discoveries has been made to the generation of electric current for power purposes, for the reason that all the thermo-electric generators that have been devised, have been so very inefficient that they cannot compete with other means for generating electric current. In this specification, and in the accompanying drawings which form a part thereof, I fully describe and illustrate a practical means for converting heat directly into electricity.

The principal losses in the thermo-electric generator as it has been heretofore constructed, are due to the rapid conduction of heat, as heat, through the substances of which the generator is composed, from the hot junction to the cold junction, where it must be disposed of by radiation or otherwise; and to the generation of heat by the current in overcoming the resistance of the substances. The first could be reduced by making the elements very long, thus reducing the slope of the temperature; the second, by making the elements very short, which would reduce the electrical resistance. These two conditions are contradictory and impossible of attainment in the ordinary thermo-electric pile.

The object of my invention is to provide a means for reducing these losses to a minimum, and to construct a thermo-electric generator which shall compare favorably in efficiency with other forms of heat motors. I accomplish this object by taking the junction through a recurring cycle of four operations: First, the junction is heated to the upper limit of temperature by passing the electric current through it in the direction to liberate heat while the junction is inclosed by insulating material to prevent escape of heat. Second, the current is then reversed and sent through the junction in the direction to absorb heat, but the temperature is maintained substantially constant by placing the junction in a hot chamber wherein heat absorbed by the current is replaced by heat received from the hot chamber. Third, with the current still flowing in the direction to absorb heat the junction is then passed into an insulating chamber, wherein the absorption of heat by the current results in reducing the temperature to the lower limit. Fourth, the current is again reversed and sent through the junction in the direction to liberate heat and at the same time the junction is passed into a cold chamber wherein the temperature is maintained substantially constant by the heat being carried off by the cold chamber. Opposite junctions of each element are, of course, passed through opposite steps of the cycle at the same time. The principle upon which this cycle of operation is founded is very similar to that enunciated by Carnot for the fluid pressure engine,—a principle which must be closely adhered to for securing the greatest possible efficiency in any form of heat engine whatever.

Figs. 6 and 7 of the accompanying drawing are indicator diagrams of the theoretical fluid pressure engine, and of my thermo-electric generator respectively, which show quite clearly the similarity of the cycle of operation of the two. In Fig. 6 the curve A—B represents the adiabatic compression of the fluid during which time work is done upon the fluid, and its temperature is raised from the lower isothermal A—D to the upper isothermal B—C. The curve B—C represents the isothermal expansion of the fluid during which work is done by the fluid on the piston, and its temperature is kept constant by heat received from an external source. The curve C—D represents the adiabatic expansion during which work is done by the fluid, and its temperature is reduced from the upper to the lower working limits. The curve D—A represents the isothermal compression of the fluid during which work is expended on the fluid, and its temperature is maintained constant by rejecting the heat liberated to the refrigerator. In Fig. 7 the line A—B represents the period during which the current is heating the junction and raising its temperature from the lower isothermal A—D to the upper isothermal B—C. The line B—C represents the period during which the current is absorbing heat at the junction, which heat is supplied by the hot chamber, thus maintaining the temperature constant. The line C—D represents the period during which the current absorbs heat and reduces the temperature of the junction from the upper to the lower isothermal. The line D—A represents the period during which the current liberates heat which is rejected to the cold chamber and the temperature thereby maintained constant. The areas $a$ A D $d$ and $b$ B A $a$ represent work done by the current and are to be reckoned negative. The areas $b$ B C $c$ and $c$ C D $d$ represent heat transformed into electricity, and are to be reckoned positive. The difference between the positive and negative areas, or the area A B C D, represents the amount of useful work done, or, in other words, the amount of electrical energy developed and available for use in the external circuit. The apparent difference in the two diagrams, (Figs. 6 and 7), is due to the fact that the ordinates represent quantities of different kind. In Fig. 6 the vertical ordinates represent pressures and the horizontal ordinates represent volumes; in Fig. 7 the vertical ordinates represent electromotive forces and the horizontal ordinates represent quantities of electricity. As the electro-motive force at a junction is constant while the temperature remains constant, the isothermals are horizontal straight lines, while in Fig. 6, as is well known, the isothermals are equilateral hyperbolas.

The diagrams Fig. 6 and Fig. 7 are theoretical and are never realized in practice. The diagram of my thermo-electric generator would perhaps not approach any closer to that of Fig. 7 than the diagram of the best fluid pressure engine approaches that of Fig. 6. In practice the diagram has its corners rounded off, and more nearly resembles an ellipse than the figure shown in Fig. 7.

There are two kinds of losses incurred in the operation of all heat engines: one is the heat rejected at the lower limit of temperature, and the other is the heat conducted away and radiated by the parts of the engine. The first cannot possibly be avoided, as to avoid it requires the lower working limit of temperature to be at the absolute zero which cannot be attained in practice. The second can be minimized by proper construction and methods of operation. To the second class belong the losses, mentioned above, incurred in the operation of the thermo-electric generator as heretofore constructed and which it is the object of this invention to reduce to a minimum.

Fig. 1 shows a sectional end elevation, and Fig. 2 a sectional side elevation of a preferred form of my thermo-electric generator embodying my invention. The thermo-electric elements are arranged in rows, and these rows are arranged in the form of a drum with the rows lying parallel to the axis of the drum and suitably insulated from each other. The drum thus formed is supported on the spiders 25 and 26, which are supported by and are free to rotate on the journals 31 and 32 respectively. The journals 31 and 32 are supported by the pillars 29 and 30 respectively, which project upwardly from the base 19. Attached to the spider 25 is the worm wheel 20, meshing with the screw 21, which may be driven by a small electric motor, or other means, (not shown), for the purpose of slowly rotating the drum. A cylindrical shell divided into the compartments 8, 10, 11 and 14 surrounds the rotatable drum, and is fixed to the base 19. The compartments 8 and 10 of the shell contain insulating material $a$, preferably asbestos, for the purpose of preventing the interchange of heat between the thermo-electric junctions adjacent thereto and the air or other surrounding objects. The compartment 11 is the one in which the junctions receive heat from a source of heat while the junctions are passing by the compartment. The source of heat may be a gas flame, the gas being led in through the pipe 1 and the burned gases escaping by the pipe 5. The part of the shell forming the compartment 11 has ribs projecting from its inner surface, for the purpose of deflecting the flame downwardly against the junctions. The compartment 14 is the one in which the rejected heat is carried away from the junctions. This may be effected by a current of cold air blown in through the pipe 4 and out at the opposite end of the compartment. The compartment 14 also has ribs projecting from its inner surface, for the purpose of causing the current of air to impinge against the junctions. These ribs may, if desired, be replaced by pipes through which cold water is kept circulating as shown at $14^a$, in Figs. $1^a$ and $2^a$. A similar shell divided into similar compartments is placed within the rotatable drum and supported by spiders 27 and 28 fixed to the inner ends of the journals 31 and 32 respectively. 12 is the cooling compartment; 13 is the heating compartment, and 7 and 9 are the insulating compartments, of this inner shell. The air pipe 2, through which air is blown for cooling the compartment 12, is led in through the journal 32, which is hollowed out to receive it. The gas pipe 3 is led in through the air pipe 2. The pipe 6 for the escape of the burned gases passes out through the hollow journal 31. The inner series of compartments are so located relatively to the outer series of compartments, that opposite junctions of each element, are, at the same time, passing through opposite points or operations of the cycle.

The rows of elements are connected together electrically, and connected to the bars of the commutator 22 in much the same manner as the conductors on the armature of the well known magneto-electric generator. Fig. 3 shows a development on a plane surface of a part of the drum with its rows of elements, and a part of the commutator. The rows of elements are connected in two separate and independent series. This is done to avoid the short circuiting of two rows when the collecting brush touches two adjacent bars of the commutator, which it does when passing from one bar to the next. Substantially this same method of connection is employed in some alternating current motors of the commutator type. The brushes are made slightly narrower than one bar of the commutator, so as not to touch three bars at one time. 23 and 24 represent brush holders by way of which the current enters and leaves the series of elements. The arrows clearly show the direction of flow of the current.

Fig. 4 is a view showing in detail a pair of junctions and a method of joining the elements together. The elements 36 and 37 are riveted and soldered or brazed, or otherwise securely connected to the ribbed plate 38. The plate 38 should be made of a material that is a good conductor of heat for the purpose of rapidly carrying heat to and from its junction with the elements 36 and 37. The element 36 is joined at its opposite end by a similar ribbed plate 39 to another element of the same material as 37, and so on throughout the series. 40 is a connecting strip attached to the last element in a row for the purpose of connecting it with another row or with a bar of the commutator.

If the specific electrical resistances of the elements are different, the minimum total resistance with the minimum space occupied will be secured by making the area of the cross section of the elements proportional to their respective specific resistances. Fig. 5 shows a form of construction suitable to the case where the specific resistance of the elements 41 and 43 is much less than that of the elements 42 and 44. 45 and 46 are the conveyers of heat to and from the respective junctions to which they are attached.

Returning now to Fig. 1, 15 is a junction which has just entered the heating chamber 11 after having passed through the insulating chamber 10, wherein its temperature was raised by the passage of the current. 16 is a junction opposite 15, which has just entered the cooling chamber 12 after having passed through the insulating chamber 9 wherein its temperature was lowered by the passage of the current. The current through these junctions was reversed at the time of their entrance into the chambers 11 and 12 respectively, and is flowing in the direction to absorb heat at the junction 15 and liberate heat at the junction 16. Before the heat received from the hot chamber 11 has time to flow more than a short distance into the elements joined at 15, this junction will pass out of the chamber 11 into the insulating chamber 8, wherein heat is still absorbed by the current and the temperature of the junction thereby reduced so that heat that may have passed into the elements will flow back toward the junction and be absorbed by the current. Junction 15 then passes into the chamber 14, at which time the current is reversed, but the temperature of the junction is maintained substantially constant by the abstraction of heat. The junction 16 in the mean time has passed into the chamber 13, where its upper limit of heat is being artificially maintained. After the machine has been in operation for some time, the temperature at the middle point of an element will be a mean between the highest and lowest temperatures of the junctions, and there will thereafter be no interchange of heat between the middle points of the elements and other parts of the machine. The temperatures of the junctions and adjacent parts of the elements will rise and fall in accordance with the direction of flow of current, and their position with reference to the heating and the cooling chambers. By this method of operation I am enabled to make the elements very short, and thus reduce their electrical resistance to a very small quantity. At the same time heat is not allowed to escape by conduction, as the current is given an opportunity to absorb it before it has time to penetrate very far into the elements. The electro-motive force of a single pair of elements is, of course, small when compared with other sources of electro-motive force, but this has nothing to do with efficiency. The efficiency of a one hundred volt motor may be just as high as that of a five hundred volt motor. Any desired electromotive force may be obtained by joining enough elements in series, and any desired current carrying and generating capacity may be obtained by making the cross sections of the elements large enough. The frequent reversal of the current through the junctions has a tendency to prevent deterioration, because a current in a given direction will undo that which has previously been done by an equal current in the opposite direction.

My invention is susceptible to various changes by those skilled in the art, without departing from its spirit and scope. Thus, the elements may be arranged and connected in various ways; the form of the movable carrier therefor may be changed, as may also the arrangement of the several compartments for controlling the temperatures of the junctions; various means may be employed for applying external heat to and abstracting heat from the junctions, and various other modifications may be made. The elements may consist of any suitable metals or alloys, and may be of various forms and connected with each other in various ways.

What I claim is:—

1. The herein described method of thermo-electric generation, which consists in periodically reversing the current through each thermo-electric junction to thereby alternately raise and lower the temperature of the junction to its upper and lower limits, and alternately supplying heat to and extracting heat from the junction after each current reversal to maintain the temperature effected by the current prior to the reversal; substantially as described.

2. The herein described method of thermo-electric generation, which consists in periodically reversing the current through each thermo-electric junction to thereby alternately raise and lower the temperature of the junction to its upper and lower limits, and alternately supplying heat to and extracting heat from the junction after each current reversal to maintain the temperature effected by the current prior to the reversal, one junction of each element being cooled while its other junction is being heated; substantially as described.

3. The method of thermo-electric generation, which consists in controlling the current generated by the thermo-electric elements to cause it to alternately flow in opposite directions through the junctions of said elements to thereby alternately liberate and absorb heat, and maintaining, intermediate the current reversals, substantially the temperature produced at the junctions by the action of the current prior to the reversal; substantially as described.

4. The method of thermo-electric generation, which consists in controlling the current generated by the thermo-electric elements to alternately flow in opposite directions through the junctions of the elements to thereby alternately liberate and absorb heat, and alternately applying external heat to and abstracting heat from the junctions to maintain temporarily the junctions at substantially the temperatures produced by the current; substantially as described.

5. The herein described method of thermo-electric generation, which consists in first heating a thermo-electric junction by causing the current to flow therethrough in a direction to liberate heat and raise the temperature of the junction to its upper limit, then reversing the direction of flow of current to cause it to absorb heat from the junction, and replacing the heat so absorbed by external heat to maintain the junction at a substantially constant temperature, then causing the absorption of heat by the current to reduce the temperature of the junction to its lower limit, and finally again reversing the current flow and cooling the junction to maintain its lower temperature, these operations being repeated in a recurring cycle; substantially as described.

6. The herein described method of thermo-electric generation, which consists in first heating one junction of thermo-electric elements by causing the current to flow therethrough in a direction to liberate heat and raise the temperature of the junction to its upper limit, then reversing the current to cause it to absorb heat from the junction, and replacing the heat thus absorbed by external heat to maintain the junction at a substantially constant temperature, then causing the current to absorb heat from the junction to reduce its temperature to its lower limit, and finally again reversing the current and cooling the junction to maintain its lower temperature, these operations being repeated in a recurring cycle, the two junctions of each element passing simultaneously through opposite steps of the cycle; substantially as described.

7. The method of thermo-electric generation, which consists in controlling the current generated by the thermo-electric elements to cause it to alternately liberate and absorb heat at the junctions of the elements, and alternately applying external heat to the heated junctions and abstracting heat from the cooled junction to temporarily maintain the temperatures effected by the current at times when the current is affecting the temperature of the junctions in a contrary direction; substantially as described.

8. The method of thermo-electric generation, which consists in first heating a thermo-electric junction by causing the current to flow therethrough in a direction to liberate heat and at the same time insulating the junction to minimize the escape of heat therefrom, then reversing the direction of current flow to cause it to absorb heat from the junction, replacing the heat so absorbed by external heat applied thereto, then causing the absorption of the heat by the current to reduce the temperature of the junction to its lower limit, and finally again reversing the current and cooling the junction to maintain its lower temperature, these operations being repeated in a recurring cycle; substantially as described.

9. In thermo-electric generation, the step which consists in alternately reversing the flow of current through the junctions of the thermo-electric elements to alternately raise and lower their temperatures; substantially as described.

10. In thermo-electric generation, the method which consists in alternately reversing the flow of current through the junctions to alternately raise and lower their temperatures, and in temporarily maintaining substantially constant the temperatures effected by the current prior to each reversal by the application of external heating and cooling means; substantially as described.

11. The method of thermo-electric generation, which consists in controlling the current generated by the thermo-electric elements to cause it to alternately absorb and liberate heat at any given junction, applying external heat to the junction when heat is being absorbed by the current, and abstracting heat from the junction when heat is being liberated by the current, substantially as described.

12. A thermo-electric generator having a plurality of connecting elements, means for reversing the direction of current flow through the junctions of the elements, and means for applying and extracting heat from the junctions at recurring intervals; substantially as described.

13. A thermo-electric generator having a plurality of connected elements, means for reversing the direction of flow of current through the junctions of the elements, and means for applying heat to each junction after one current reversal and for extracting heat therefrom after each opposite reversal; substantially as descibed.

14. A thermo-electric generator having a plurality of connected elements, means for reversing the direction of current flow through the junctions of the elements, and means for maintaining the temperatures effected by the current flow while the latter is acting in a direction to change such temperatures; substantially as described.

15. A thermo-electric generator having a plurality of elements, and a commutating device to which said elements are connected in independent series; substantially as described.

16. A thermo-electric generator having a plurality of connected elements, a rotary carrier therefor, and a current commutating device to which the elements are connected; substantially as described.

17. A thermo-electric generator having a rotary carrier, a plurality of thermo-electric elements mounted thereon, a current commutating device to which the elements are connected, and means for applying heat to and extracting heat from the junctions of the elements; substantially as described.

18. A thermo-electric generator having a plurality of elements, a rotary carrier for the elements, and chambers or compartments adjacent to the carrier and provided with means for affecting the temperatures of the elements; substantially as described.

19. A thermo-electric generator having a plurality of elements, a rotary carrier upon which said elements are radially mounted, and two series of chambers or compartments respectively adjacent to the opposite junctions of each element, and provided with means for changing the temperatures of the elements; substantially as described.

20. A thermo-electric generator having a rotary carrier, a plurality of radially arranged elements mounted on said carrier, heating and cooling compartments surrounding the carrier, and other heating and cooling compartments arranged interiorly of the carrier; substantially as described.

21. A thermo-electric generator having a rotary carrier, a plurality of radially arranged elements mounted on said carrier, heating and cooling compartments surrounding the carrier, and other heating and cooling compartments arranged interiorly of the carrier, some of said chambers having heat-insulating means; substantially as described.

In testimony whereof, I have hereunto set my hand.

JOHN D. TAYLOR.

Witnesses:
GEO. B. BLEMING,
GEO. H. PARMELEE.